Oct. 17, 1950     I. J. LONDON     2,526,377
PROJECTOR

Filed Nov. 29, 1947     3 Sheets-Sheet 1

INVENTOR.
ISREAL J. LONDON.
BY
Robert A. Sloman
ATTORNEY.

Oct. 17, 1950     I. J. LONDON     2,526,377
PROJECTOR

Filed Nov. 29, 1947     3 Sheets-Sheet 2

*INVENTOR.*
ISREAL J. LONDON.
BY
*Robert A. Sloman*
ATTORNEY.

Oct. 17, 1950     I. J. LONDON     2,526,377
PROJECTOR
Filed Nov. 29, 1947                           3 Sheets-Sheet 3
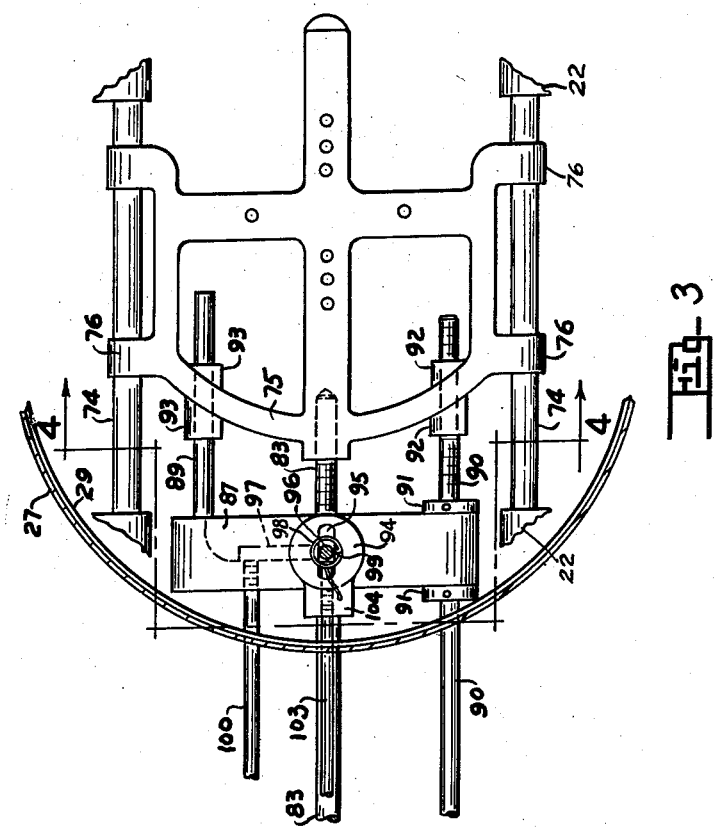
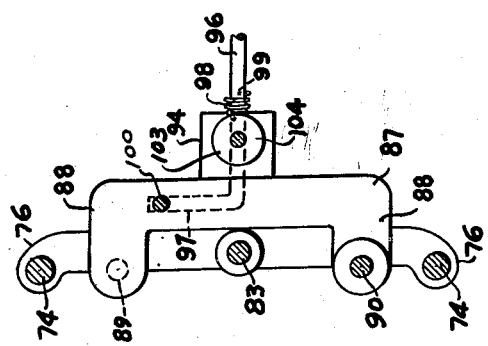
INVENTOR.
ISREAL J. LONDON.
BY
*Robert A. Sloman*
ATTORNEY.

Patented Oct. 17, 1950

2,526,377

UNITED STATES PATENT OFFICE 2,526,377

PROJECTOR

Isreal J. London, Detroit, Mich.

Application November 29, 1947, Serial No. 788,915

2 Claims. (Cl. 88—18.7)

This invention relates to projectors, and more particularly to a projector which includes a continuously movable endless film.

It is the principal object of this invention to provide a projector together with means for so mounting a plurality of spools that the film is wound upon said spools from the outside, and at the same time the film is unwound therefrom from the inside of the coil of film wound there around.

It is the further object of this invention to provide a continuous non-broken or endless film together with a particular arrangement of film retaining spools whereby the film in its entirety as stored and wound around said spools is arranged angularly with respect to the normal plane of the film as it is employed for projection, together with means whereby the film as taken off the interior of the wound film extends angularly with respect to the stored film.

It is the further object of this invention to maintain all of the film in a substantially upright position at all times, whether being wound from the outside, stored in a coil around the spools, or being taken off of said coil from the interior thereof.

It is the further object of this invention to provide a power sprocket for drawing the film past the projection portion of the projector and for delivering the same to the outer portion of the coil of stored film, and also a power sprocket for drawing the film from the interior of the coil, for supplying the same for delivery to the projection portion of said projector.

These and other objects will be seen from the following specification and claims in conjunction with the appended drawing in which:

Figure 3 is a fragmentary partially broken away plan view illustrating the adjustable support for the illuminating means as well as the adjustable support for its reflector; and Figure 4 is an elevational section on line 4—4 of Figure 3.

It will be understood that the above drawings illustrate merely a preferable embodiment of the invention, and that other embodiments are contemplated within the scope of the claims hereafter set out.

Figure 1:
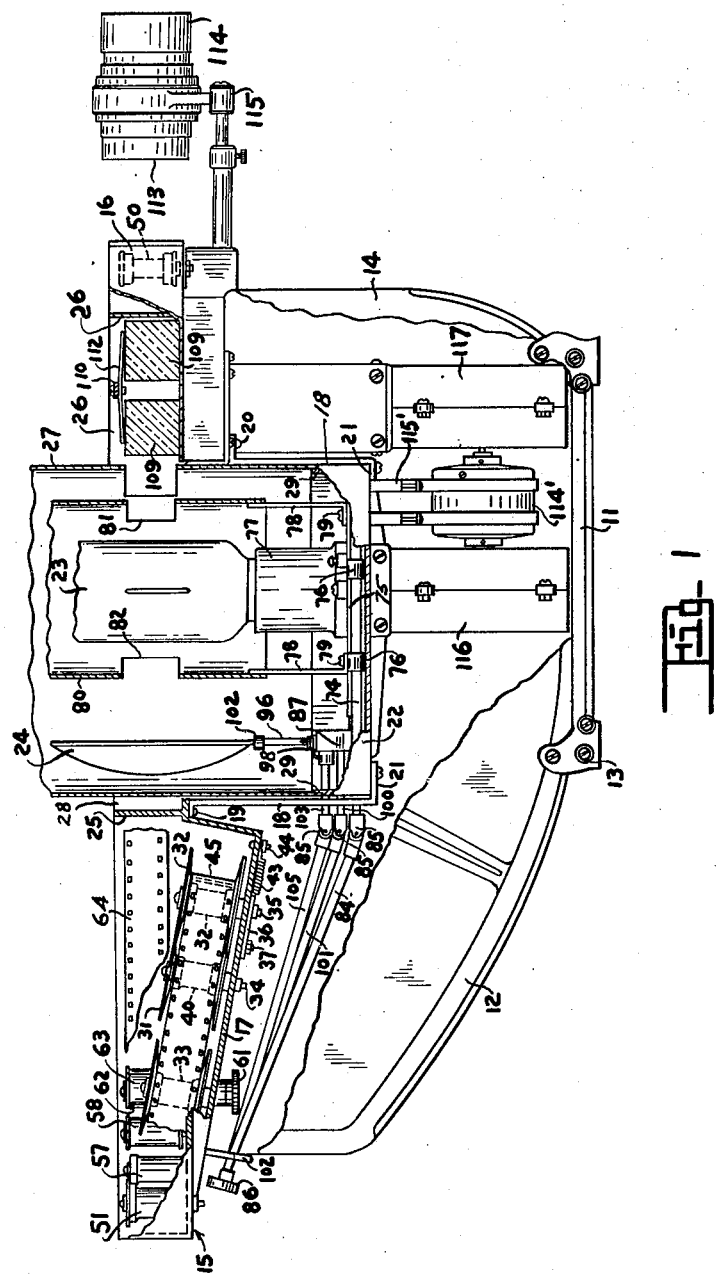
Figure 1 is a fragmentary partially sectioned elevational view of the projector, partially broken away for clarity.

Referring to the drawings, a base 11 is provided for said projector, to which are secured in parallel spaced relation the two upright projector frame elements 12, secured thereto by the bolts 13. The frame elements 12, one of which is shown in Figure 1, are open and are normally covered with a perforated member to permit the admission of air to the interior of the projector. A portion of the housing 14 is fragmentarily illustrated in Figure 1, being broken away to illustrate the interior mechanism forming a part of said projector.

Figure 2:
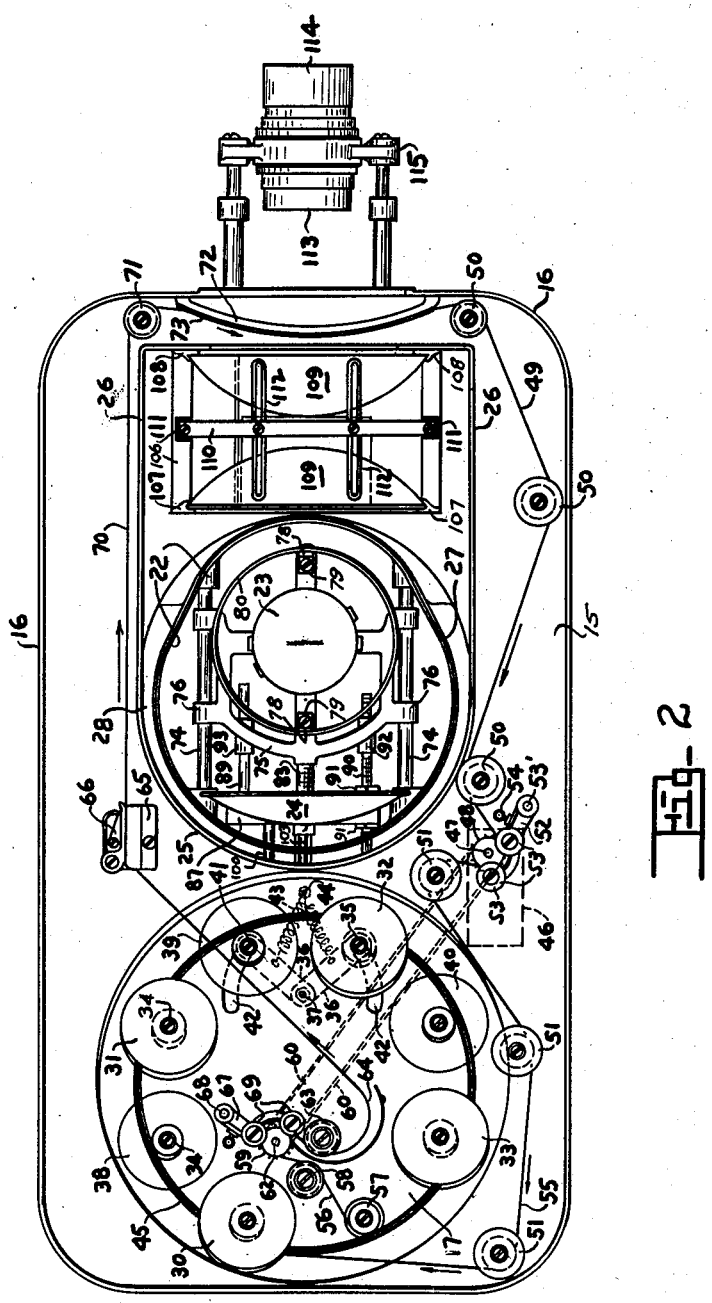
Figure 2 is a top plan view of the projector with its top cover plate removed.

A substantially rectangular platform frame generally indicated at 15, is arranged in horizontal relation upon the projector housing, and includes the vertically arranged enclosing side wall portions 16 as illustrated in Figure 2. A suitable cover plate is normally provided for said horizontal frame and is adapted to bear upon the top edges of the upright portions 16.

Said frame is constructed to also include the angularly and downwardly inclined platform element 17, Figures 1 and 2 upon which the film storage spools are mounted in the manner hereafter described.

A bracket, or a pair of brackets 18, are secured to frame 15 at points 19 and 20 and extend downwardly therefrom, terminating in the inwardly projecting supporting ledges 21 upon which is mounted the casting 22, i. e. the frame work upon which the illuminating means 23 and reflector 24 are adjustably positioned.

As viewed in Figures 1 and 2 the frame 15 includes a substantially central upright flange portion 25 which is arcuate as viewed in Figure 2, whose end portions terminate in the rectangularly shaped flanged portion 26.

A hollow upright substantially circular cylindrical stack element 27 is uprightly mounted within the circular opening 28 included within the upright platform flange 25—26, with its lower substantially circular edge mounted upon the annular seat 29 formed within the casting 22.

As best illustrated in Figure 2 a plurality of circularly arranged film supporting spools 30, 31, 32, 33, are positioned in spaced relation upon the angularly extending platform 17. Each of said spindles are loosely and rotatably journalled upon the respective upright supporting shafts 34, which are secured at their lower ends to said platform, with the exception of the spool 32, whose supporting shaft 35 is carried upon the end of a link 36, the inner end of which is pivotally mounted upon a bolt 37 which projects downwardly from the underside of platform 17.

There are a plurality of open ended spools 38, 39 and 40 also circularly arranged alternately with respect to closed spools 30, 31, 32 and 33, and which are rotatably journalled upon the supporting shafts 34, also extending substantially normal to the surface of platform 17, and whose lower ends are suitably secured thereto.

It will be noted that the open spool 39 is journalled upon the upright shaft 41 which extends from the second link 36. The other end of said link is also pivotally joined to the pivotal support for the first mentioned link 36, and is similarly positioned below the platform 17.

The two shafts 35 and 41 extend upwardly from said links 36 and through the arcuate slots 42 formed in platform 17, and are adapted to pivotal movement therein about the axis 37.

A pair of coiled springs 43 are anchored at one end by the bolt 44 extending from the underside of platform 17, with the respective other ends of said springs joined to the links 36 tending to retain the same in the dotted line position shown in Figure 2.

From the above it is clear that the two spools 32 and 39 are adapted for inward adjustment relative to the coil of film 45 which is wound around all of the aforementioned spools, and are adapted to automatically take up any tension in the film which might otherwise cause its rupture. It is thus seen that the spools 32 and 39 are mounted upon a yielding support which likewise takes up any slack which may develop in the coil of film.

An electric motor is diagrammatically indicated in dotted lines as element 46 positioned within the projector housing and supported in any convenient manner upon the underside of the platform 15. A reduction gear arrangement is provided, not shown but which is joined to said motor and also to the shaft 47 which extends upwardly through the platform 15, and which carries at its upper end the conventional film pulling sprocket 48.

The film element 49 extends past the three idler spools 50 and is projected around the drive sprocket 48 and thence around idler spools 51 rotatably journalled upon the top of platform 15. A film retaining arm 52 is pivotally mounted at 53' upon platform 15 and its two stationary spool elements 53 are adapted to engage the outer edge of film element 49 for maintaining the same in interlocking engagement with the drive sprocket 48. A stop 54 is positioned on platform 15 and is adapted to limit the movement of the arm 52 relative to said sprocket.

The film element 55, being a continuation of film element 49 is adapted for movement past the idle spools 51 and is thence directed to the inclined spools 30, 31, 32, 33, 38, 39 and 40. The film is then wound into the coil 45 about all of said spools, with the film element 55 at all times joining the outer of the film elements arranged in said coil.

The inner winding of said coil terminates in the film element 56 which passes around the idler spool or roller 57, past idler spool 58 and into operative engagement with the secondary drive sprocket 59. The later rotates in unison with motor driven sprocket 48, there being a suitable sprocket chain 60, positioned below platforms 15 and 17, adapted to interconnect sprocket gear 61, Figure 1, on the lower end of shaft 62 to which the upper drive sprocket 59 is secured, and a corresponding sprocket gear positioned upon motor driven shaft 47.

Thus it is seen that the two sprockets 48 and 59 are adapted to both operatively engage the film elements 49 and 56 respectively. Sprocket 48 is adapted to exert a longitudinal thrust upon the uncoiled film element 49 as it approaches the coil 45, while the sprocket 59 is adapted to exert a longitudinal thrust upon the film element 56 as it unwinds from the interior of the coil 45 as shown in Figure 2.

Film element 56 projects from sprocket 59 and operatively bears against the idler spool 63, and beyond the latter spool forms the slack film element 64, whence it extends substantially horizontally and in an upright position over the outer portion of coil 45. The film element 64 is thence conducted through the film tension guide 65 which includes the spring loaded pivotal arm 66 which bears upon one surface of the film element 64.

Similarly a second film holding arm 67 is pivotally mounted at 68 to the inclined platform 17, with its two cylindrically shaped film holders 69 tending to maintain the film element 56 upon sprocket 59, and guiding the same to the idler spool 63.

The film element 64 is substantially slack intermediate the guide spool 63 and a film tension device 65—66, however, the film is moderately taut upon leaving the said film tension device, defining the film element 70.

Film element 70 is now adapted to move in a rectilinear direction, and passes around the guide roller or spool 71, longitudinally past the apertured support 72 and thence around the guide roller 50, terminating in the return film element 49.

The support 72 is arcuate and has formed therein at its rear surface a pair of spaced guide channel elements 73 which cooperatively receive the top and bottom longitudinal edges of the film as it passes the support 72. It is contemplated that said support is horizontally slotted throughout substantially its length permitting the passage of light from the illuminating means hereafter described and through the film element 70, as it passes through the apertured support 72.

As shown in Figure 2 the film employed is unitary and is adapted for continuous uninterrupted movement. Said film includes the coil of film 45 which is rotatively positioned around the idler spools upon the inclined storage platform 17, as well as the uncoiled portion of film defined by film elements 56, 64, 70, 49 and 55.

In operation it will be seen that said uncoiled film is moving continuously, and likewise the coil 45 is rotating continuously about its supporting spools. While the storage platform 17 is slightly inclined, the flat surfaces of the coil firm are substantially upright in position, as is also the film element 64 as it passes from the guide spool 63 to the film tension device 65, 66.

Referring to Figures 1, 2, 3 and 4 a pair of horizontally arranged guide rods 74 are secured at their ends within the casting 22, and arranged in spaced relation. Bracket element 75 having a pair of aligned oppositely arranged hollow collars 76, is slidably positioned upon the guides 74, which cooperatively extend through collars 76.

An electrical socket 77 is suitably mounted in upright position upon the bracket 75, and is adapted to threadably receive the high wattage illuminating means 23 which extends upwardly beyond the platform 15 for projecting illumination through the apertured support 72 which carries the film element 70.

A pair of upright supporting arms 78 are secured in spaced relation upon the central portion of bracket 75 by means of the screws 79, and are adapted to have secured thereto at their upper ends a cylindrical bulb enclosing housing 80 which is arcuately and transversely slotted at 81 to permit the transmission of light through the apertured support 72. Said housing is also arcuately and transversely slotted at 82 permitting the passage of illumination from bulb 23 to the concave reflector 24.

Threaded shaft 83 threadably extends through a central threaded aperture in the bracket 75, with its outer end connected to the manually rotatable shaft 84 by the universal connection 85. Manual rotation of handle 86 upon the outer end of shaft 84 is thus adapted to effect reciprocal longitudinal adjustments of bracket 75 and the bulb 23 carried thereon.

A reflector standard 87 as shown in Figure 4 has a pair of spaced downwardly extending legs 88 which respectively carry the guide shaft 89 at one end, and through the other of which extends threaded shaft 90. The latter shaft is rotatable through a transverse opening in standard 87 and is adapted to cause longitudinal translation of said standard, by means of the two collars 91 which are pinned to said shaft upon opposite sides of standard 87.

The outer end of shaft 90 is threadably projected within the boss 92 which forms an integral part of bracket 75, whereby manual rotation of shaft 90 will cause longitudinal adjustment of the standard 87 with respect to the bracket 75. Though not shown in the drawing the threaded shaft 90 is similarly joined to a manually rotatable shaft by means of a similar universal joint whereby said shaft may be selectively rotated in one direction or the other for effecting longitudinal adjustments of the reflector standard 87 with respect to bulb supporting bracket 75.

It will be noted however, that adjustments of the bracket 75 by virtue of threaded shaft 83 will cause a corresponding adjustment of standard 87 in view of the collars 91 on opposite sides of said standard. The guide shaft 89 projects longitudinally from said standard for sliding engagement within and through the corresponding hollow boss 93 which depends from brackets 75. Manual rotation of shaft 90 will thus cause a longitudinal adjustment of reflector standard 87 relative to bracket 75, with guide shaft 89 being reciprocal within the boss 93 forming a part of bracket 75.

As viewed in Figure 4 the standard 87 terminates in a central upright member 94 which has a vertically arranged slot 95 formed therein throughout substantially its length. A swivel arm 96 is centrally positioned within the slot 95, and adapted for forward and backward tilting movements therein. The lower end of swivel 96 extends through a central opening in upright element 94 and terminates in the rightangular actuating arm 97 which lies within the hollow portion of standard 87 and is normally supported by its lower wall.

As viewed in Figure 4 as well as in Figure 3, coil spring 98 extends around the swivel arm 96, while the free end of said spring is suitably anchored within a slot formed in the upright element 94 forming a part of standard 87. Said spring is intended to normally position the swivel 96 in a substantially central position within the slot 95, and at the same time is adapted to resist rotative movement of said swivel, inasmuch as the opposite end of the coil spring is secured to said swivel at 99 Figure 3.

Manually rotatable shaft 100 threadably extends through a corresponding threaded opening in the front wall of standard 87, and is adapted to operatively engage the outer end of the arm 97 which forms a part of the swivel 96. Shaft 100 terminates in a universal joint 85 which is joined similarly to the manually rotatable shaft 101, whose outer end extends through the bracket 102, for remote manual control of shaft 100. A suitable handle upon the outer end of shaft 101 is thus adapted to effect rotary movement of shaft 100 whereby arm 97 may be rotated against the action of the coil spring 98.

In this connection as viewed in Figure 1 the reflector 24 is secured at 102 to the upper end of rotatably adjustable swivel 96, whereby said reflector may be rotatably adjusted horizontally upon manual rotation of shaft 100.

A secondary controlling shaft 103 threadably extends through the boss 104 forming a part of the upright 94, and is adapted to operatively engage the central portion of swivel 96 for effecting or permitting tilting movement of said swivel within its guide slot 95. As above described the lower end of said swivel extends through the central opening in said standard at the base of slot 95 whereby a suitable fulcrum is provided for the lower end of said swivel. The shaft 103 is suitably connected to a manually rotatable shaft 105 by means of a similar universal joint 85, as shown in Figure 1.

The outer end of shaft 105 extends through the bracket 102 and terminates in a suitable handle, which may be manually rotated to effect forward and backward tilting movement of the swivel 96 within its vertical slot 95.

As above described it is clear that shaft 100 will cause adjusting rotation of reflector 24 in a horizontal plane, while the manually rotatable shaft 103 will cause forward and backward adjustment of said reflector in a vertical plane. As above described shaft 90 is adapted to effect longitudinal adjustment of the reflector standard 87 relative to bulb supporting bracket 75, whereas manually rotatable shaft 83 is adapted to effect longitudinal adjustment of bracket 75 as well as the standard 87 which is joined thereto in a manner as above described in detail.

A hollow condenser lens housing element 106, Figures 1 and 2, is positioned upon the platform 15 intermediate the apertured support 72 and the illuminating means 23. A pair of vertically grooved upright supports 107 form a part of said housing and are positioned at its rear portion, and a second pair of vertically grooved spaced upright supports 108 are positioned at its front portion.

A pair of oppositely arranged convex light condensing lenses 109 are positioned within housing 106 with their ends slidably positioned and retained within the vertically grooved supports 107 and 108.

A cross bar 110 centrally extends across housing 106 and is secured thereto by the screws 111. A pair of spring clips 112 are supported upon cross bar 110, with their ends adapted to respectively bear upon the top surfaces of the lenses 109 for retaining the same within their vertically grooved supports in housing 106.

Thus it will be seen that illumination from bulb 23 and its reflector 24 is directed through slots 81 and 82 of the cylindrical bulb enclosing member 80, and through the two condensing lenses 109, whose supporting housing 106 is open along its long sides. The illumination is then directed through the film element 70 which is positioned upon apertured support 72 and the image from the film is transmitted through the adjusting lenses 113 and 114 which are mounted upon the longitudinally adjusted support 115 at the front end of the projector.

The condenser lenses 109, as viewed in Figure 1, are flat at their top and bottom surfaces, being cut from the central portion of a convex lens, representing a central segment taken therefrom.

As viewed in Figure 1, a motor 114' is supported within the projector housing by means of the supporting straps 115', which depend from casting 22. The drive shaft from said motor extends oppositely therefrom with its ends respectively terminating within the air impeller housings 116 and 117, and carry a pair of rotatable impeller blades, not shown, whereby a source of ventilation is provided upwardly past the bulb 23 and its compartment, as well as into the front portion of the projector adjacent the condenser lenses and the film element 70.

Having thus described my invention reference should now be had to the claims which follow for determining the scope thereof.

I claim:

1. In a projector having an aperture, a horizontally arranged platform, a film storage platform forming a part thereof and extending angularly downward, a plurality of spaced circularly arranged idler spools upon said storage platform, a rotatable coil of film extending around said spools and lying in an inclined plane, a plurality of spaced film guide spools upon said horizontal platform, an uncoiled portion of film bearing against said guide spools adapted for continuous movement past said aperture, with its respective ends joined to the inner and outer windings of said coil to form a continuous film, and spring loaded pivoted supports for a pair of said idler spools permitting yielding inward movement thereof toward the center of said coil to prevent excessive tension therein.

2. In a projector having an aperture, a horizontally arranged platform, a film storage platform forming a part thereof and extending angularly downward, a plurality of spaced circularly arranged idler spools upon said storage platform, a rotatable coil of film extending around said spools and lying in an inclined plane, a plurality of spaced film guide spools upon said horizontal platform, an uncoiled portion of film bearing against said guide spools adapted for continuous movement past said aperture, with its respective ends joined to the inner and outer windings of said spool, there being a pair of arcuate slots formed in said storage platform, spring loaded links pivotally mounted upon the under side of said platform, and supporting means on the free ends of said links extending upwardly through said slots and joined to a pair of said idler spools permitting yielding inward movement thereof toward the center of said coil.

ISREAL J. LONDON.

REFERENCES CITED

The following references are of record in the file of this patent:

UNITED STATES PATENTS

| Number | Name | Date |
| --- | --- | --- |
| 916,788 | Sandell | Mar. 30, 1909 |
| 1,032,065 | Kamm | July 9, 1912 |
| 1,125,729 | Salmon | Jan. 19, 1915 |
| 1,146,948 | Patterson | July 20, 1915 |
| 1,211,955 | Miller | Jan. 9, 1917 |
| 1,270,269 | Davis | June 25, 1918 |
| 1,282,006 | Tartt | Oct. 15, 1918 |
| 1,338,818 | Dennington | May 4, 1920 |
| 1,426,614 | Sutherland | Aug. 22, 1922 |
| 1,463,417 | Blankenberg | July 31, 1923 |
| 1,505,389 | Herm | Aug. 19, 1924 |
| 1,542,408 | Readeker | June 16, 1925 |
| 1,800,211 | Devault | Apr. 14, 1931 |
| 1,879,600 | Burchett | Sept. 27, 1932 |
| 1,977,120 | Dirkes et al. | Oct. 16, 1934 |
| 2,065,954 | Mihalyi | Dec. 29, 1936 |
| 2,163,870 | Dallenbach | June 27, 1939 |

FOREIGN PATENTS

| Number | Country | Date |
| --- | --- | --- |
| 283,371 | Great Britain | Jan. 12, 1928 |
| 460,667 | Germany | June 2, 1928 |